US008154168B2

(12) United States Patent
Hsieh

(10) Patent No.: US 8,154,168 B2
(45) Date of Patent: Apr. 10, 2012

(54) FIXING ENHANCEMENT MECHANISM FOR LARGE IRON CORE

(75) Inventor: Ming-Hung Hsieh, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 332 days.

(21) Appl. No.: 12/612,137

(22) Filed: Nov. 4, 2009

(65) Prior Publication Data

US 2011/0101819 A1    May 5, 2011

(51) Int. Cl.
  *H02K 1/18*    (2006.01)
  *H02K 15/02*   (2006.01)
(52) U.S. Cl. .......................... 310/216.114; 310/216.129
(58) Field of Classification Search ........... 310/216.114, 310/418, 427–428, 216.129, 432
See application file for complete search history.

(56) References Cited

U.S. PATENT DOCUMENTS

| | | | | |
|---|---|---|---|---|
| 1,685,054 A | * | 9/1928 | Hibbard | 310/433 |
| 3,238,404 A | * | 3/1966 | Spiess | 310/216.114 |
| 4,494,030 A | * | 1/1985 | Mulach et al. | 310/256 |
| 4,810,919 A | * | 3/1989 | Ponce et al. | 29/596 |
| 5,069,587 A | * | 12/1991 | Levenstein | 411/432 |
| 6,337,530 B1 | * | 1/2002 | Nakamura et al. | 310/216.066 |
| 6,346,760 B1 | * | 2/2002 | Boardman, IV | 310/216.007 |
| 6,608,419 B2 | * | 8/2003 | Shah et al. | 310/216.076 |
| 6,949,858 B2 | * | 9/2005 | White et al. | 310/216.004 |
| 7,375,450 B2 | * | 5/2008 | Tanaka et al. | 310/216.004 |
| 2008/0231138 A1 | * | 9/2008 | Onimaru et al. | 310/217 |

FOREIGN PATENT DOCUMENTS

| | | | |
|---|---|---|---|
| JP | 6-141515 | * | 5/1994 |
| JP | 2001-25185 | * | 1/2001 |

* cited by examiner

*Primary Examiner* — Burton Mullins
(74) *Attorney, Agent, or Firm* — Guice Patents PLLC

(57) ABSTRACT

A fixing enhancement mechanism for large iron core, including an iron core and two end rings. The iron core is composed of several arc-shaped bodies, which are successively connected in an annular form with their curvature centers coinciding with each other. The end rings are coaxially fixedly connected to two axial ends of the iron core respectively to keep the iron core in the annular form. The fixing reinforcement mechanism further includes an enhancement section having several rod-shaped enhancement members. The enhancement members are bridged between the two end rings in abutment with outer arc surfaces of the arc-shaped bodies. According to the fixing enhancement mechanism, the components for fixing the large iron core are simplified and the fixing performance is enhanced to keep the motor operating stably.

3 Claims, 5 Drawing Sheets

FIXING ENHANCEMENT MECHANISM FOR LARGE IRON CORE

BACKGROUND OF THE INVENTION

The present invention relates generally to a motor, and more particularly to a fixing enhancement mechanism for large iron core.

FIG. 1 shows an iron core 1 of a conventional large-size motor for winding a winding coil thereon. In manufacturing, due to the limitation of the large size, the iron core 1 is generally divided into multiple arc-shaped blocks 1a to facilitate processing.

FIG. 2 shows a measure for assembling the arc-shaped blocks 1a into the iron core 1. The arc-shaped blocks 1a are connected and assembled into a complete ring-shaped iron core 1 with their curvature centers coinciding with each other. After assembled, the iron core 1 is fixedly enclosed in a tubular housing 2. Such measure is able to accurately and firmly fix the iron core 1. However, it is necessary to manufacture an even larger housing for accommodating the iron core 1. This leads to increment of manufacturing cost and troublesomeness in assembling process. Moreover, with the housing 2 as a component of the motor, the heat generated by the motor in operation will be hindered by the housing 2 from dissipating outward. As a result, the operation efficiency will be affected due to poor heat dissipation efficiency.

FIG. 3 shows another conventional measure for fixing the iron core 1 without resulting in heat dissipation problem. Two end rings 3 are coaxially fixedly connected to two axial ends of the iron core 1 to hold and lock arc-shaped blocks 1a together. Such fixing measure simply applies an axial force to the iron core 1 and only provides very little component force normal to the axis of the iron core 1. Therefore, it is necessary to further clamp the end rings 3 and the iron core 1 with two end boards 4. In addition, several circular rods 5 are bridged and locked between the end boards 4 to enhance the fixing force of the end rings 3 to the iron core 1. The additional end boards 4 leads to increment of manufacturing cost. Furthermore, the end boards 4 still mainly apply an axial force to the iron core 1. The circular rods 5 are spaced from the iron core 1 by a certain distance to provide a component force normal to the axis of the iron core 1. However, the magnitude of the component force is in proportion to the distance between the iron core 1 and the circular rods 5. Therefore, for achieving better iron core fixing effect, it is necessary to enlarge the distance between the circular rods 5 and the iron core 1. This will lead to excessively large volume and waste of room.

SUMMARY OF THE INVENTION

It is therefore a primary object of the present invention to provide a fixing enhancement mechanism for large iron core, in which the components for fixing the large iron core are simplified and the fixing performance is enhanced.

It is a further object of the present invention to provide the above fixing enhancement mechanism for large iron core, which is applicable to a motor without hindering heat from dissipating. Therefore, with the fixing enhancement mechanism, the motor can still operate stably.

To achieve the above and other objects, the fixing enhancement mechanism for the large iron core of the present invention includes an iron core and two end rings. The iron core is composed of several arc-shaped bodies, which are successively connected in an annular form with their curvature centers coinciding with each other. The end rings are coaxially fixedly connected to two axial ends of the iron core respectively to keep the iron core in the annular form. The fixing reinforcement mechanism further includes an enhancement section having several rod-shaped enhancement members. The enhancement members are bridged between the two end rings in abutment with outer arc surfaces of the arc-shaped bodies.

The present invention can be best understood through the following description and accompanying drawings, wherein:

DETAILED DESCRIPTION OF THE PREFERRED EMBODIMENTS

Figure 1:
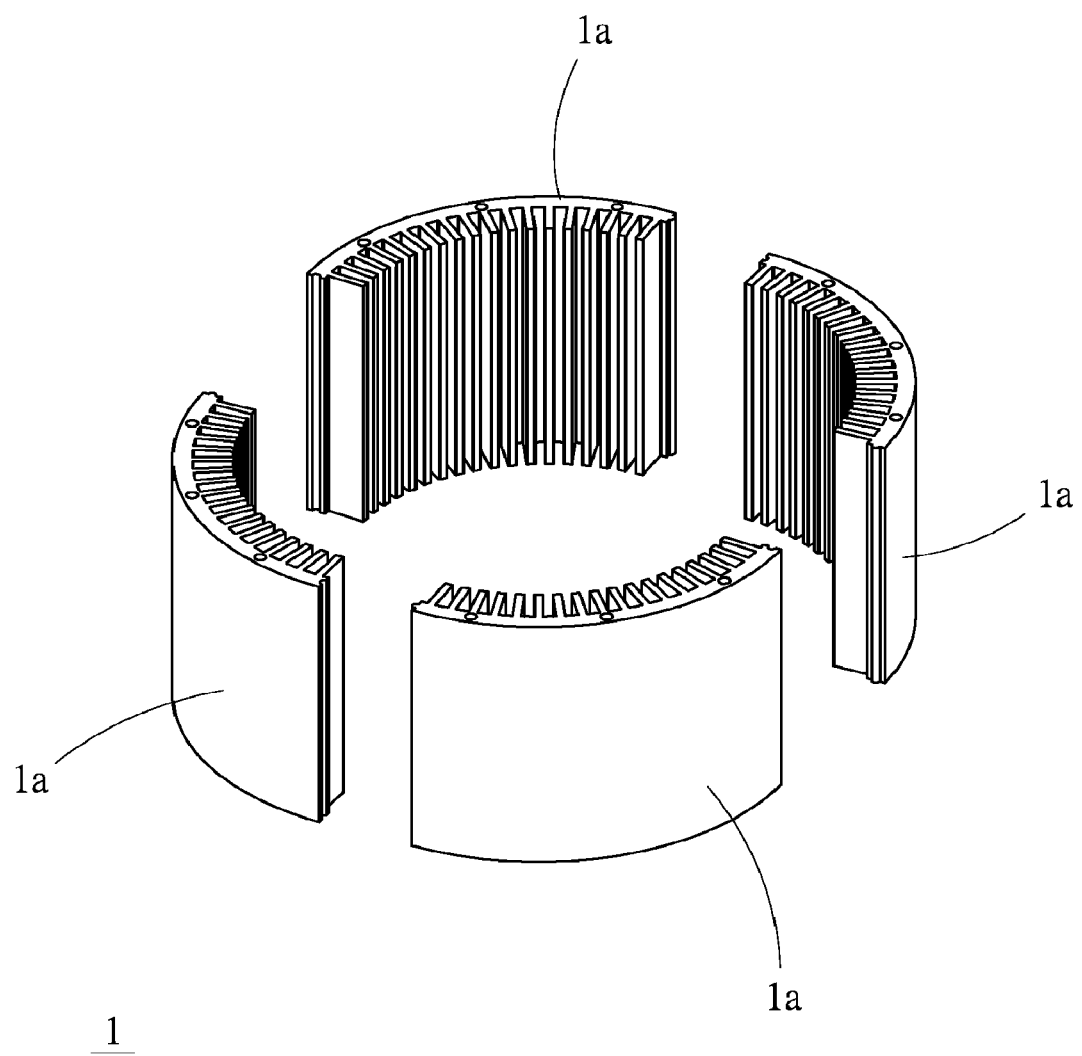
FIG. 1 is a perspective exploded view of a conventional large iron core.
Figure 2:
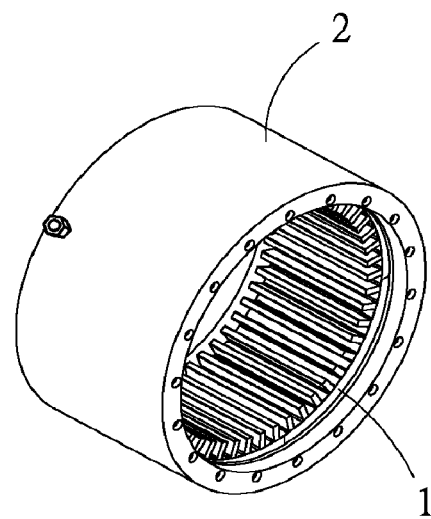
FIG. 2 is a perspective view showing a measure for fixing the conventional large iron core.
Figure 3:
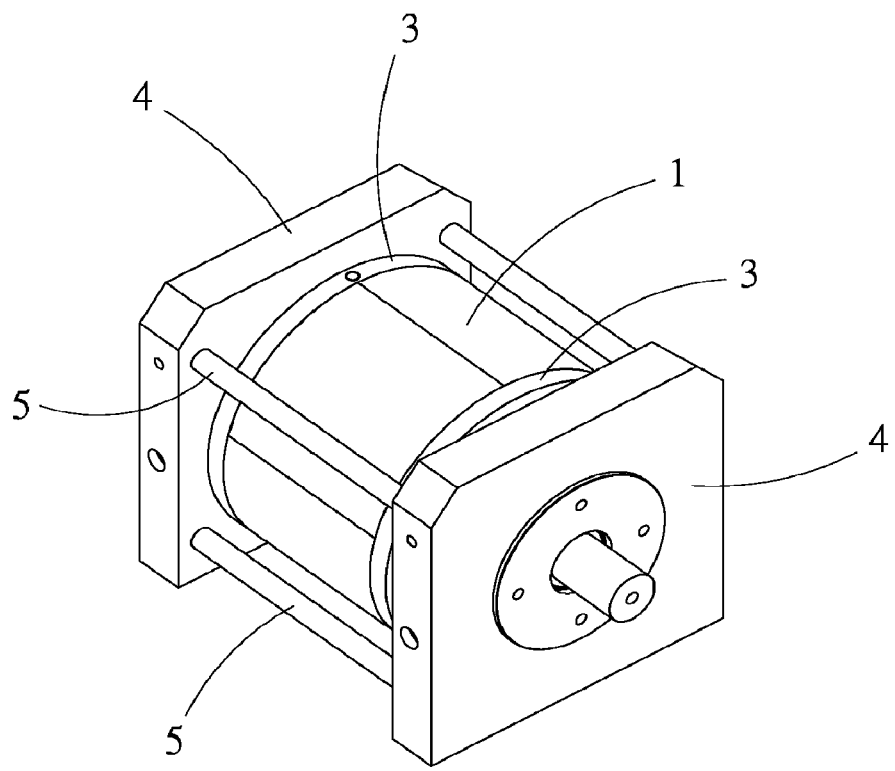
FIG. 3 is a perspective view showing another measure for fixing the conventional large iron core.
Figure 4:
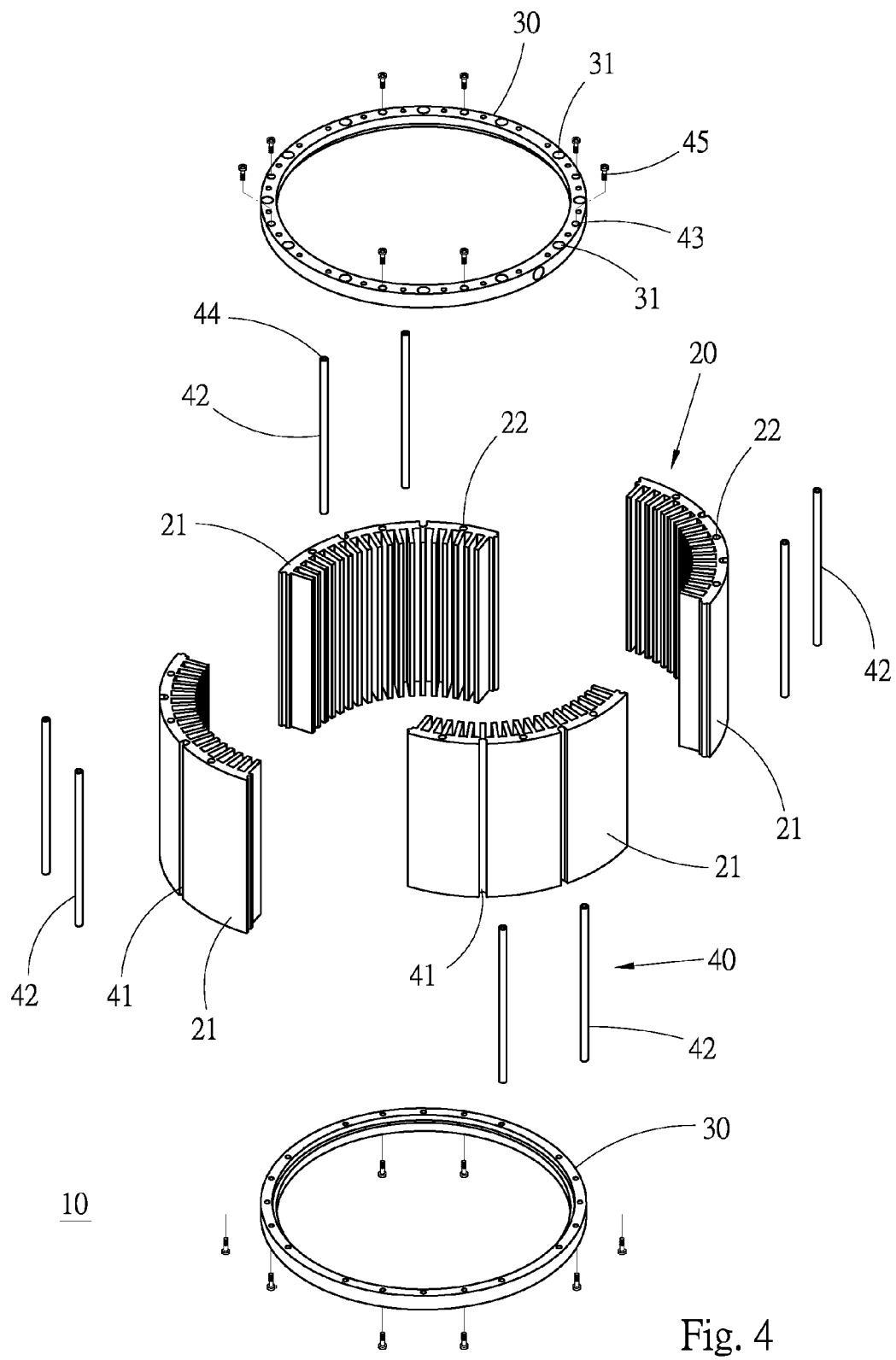
FIG. 4 is a perspective exploded view of a preferred embodiment of the present invention.
Figure 5:
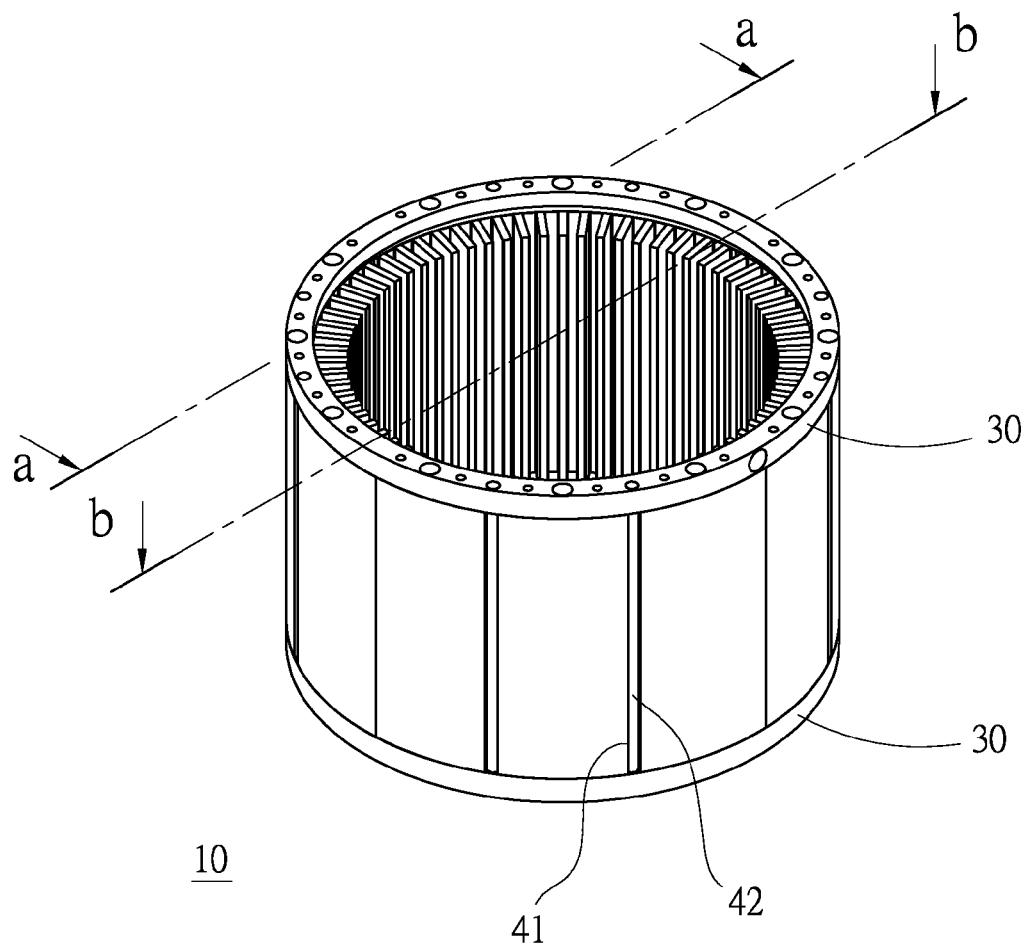
FIG. 5 is a perspective assembled view of the preferred embodiment of the present invention.
Figure 6:
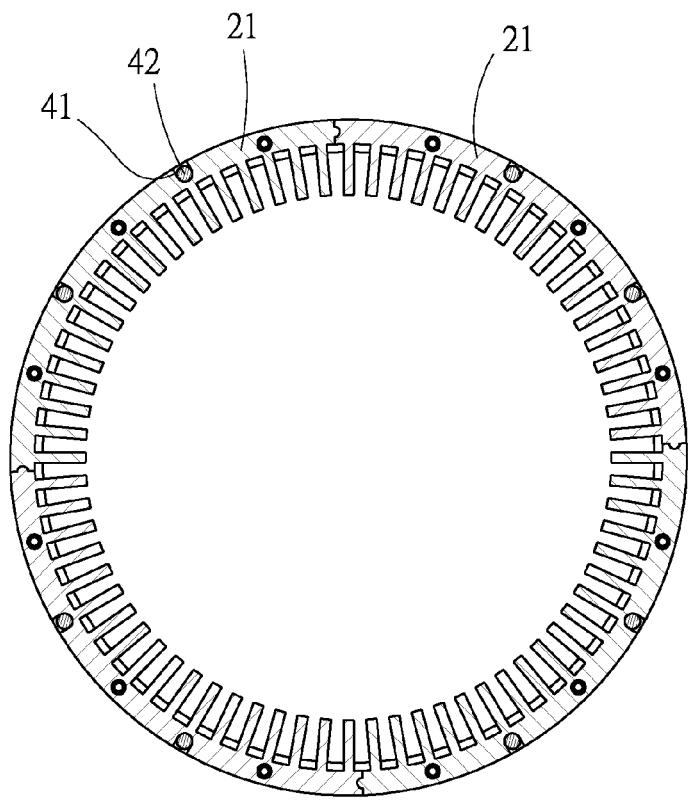
FIG. 6 is a sectional view taken along line a-a of FIG. 5.
Figure 7:
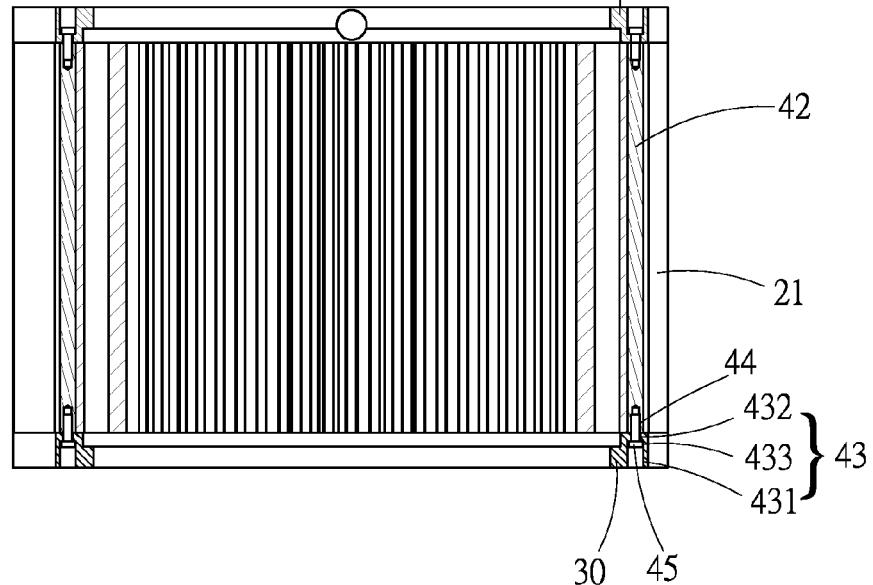
FIG. 7 is a sectional view taken along line b-b of FIG. 5.

Please refer to FIGS. 4 to 7. According to a preferred embodiment, the fixing enhancement mechanism 10 for large iron core of the present invention includes an iron core 20, two end rings 30 and an enhancement section 40.

The iron core 20 is composed of several arc-shaped bodies 21. The arc-shaped bodies 21 are successively connected in an annular form with their curvature centers coinciding with each other. This technique pertains to prior art and thus will not be further described hereinafter. The end rings 30 are coaxially fixedly connected to two axial ends of the iron core 20 respectively. The end rings 30 are formed with connection holes 22 and the axial ends of the iron core 20 are formed with corresponding connection holes 31. Bolts are screwed into the connection holes, 22 and 31 to connect the end rings 30 with the iron core 20 so as to hold the arc-shaped bodies 21 together and keep the iron core 20 in the annular form. The end rings 30 also apply axial fixing force to the iron core 20. This technique also pertains to prior art and thus will not be further described hereinafter.

The enhancement section 40 has multiple inlay channels 41 with a certain depth. The inlay channels 41 are uniformly distributively formed on outer arc surfaces of the arc-shaped bodies 21 respectively. The inlay channels 41 extend from a first axial end of the iron core 20 to a second axial end of the iron core 20 along the axis thereof. The enhancement section 40 further has multiple circular rod-shaped enhancement members 42 respectively inlaid in the corresponding inlay channels 41. First ends and second ends of the enhancement members 42 are respectively connected to the end rings 30, whereby the enhancement members 42 are bridged between the end rings 30. Multiple pairs of through holes 43 are formed through the end rings 30. The axes of the through holes 43 are parallel to the axis of the iron core 20. Multiple pairs of threaded holes 44 are coaxially formed on end faces of the first and second ends of the enhancement members 42 respectively. Multiple pairs of connection bolts 45 are respectively passed through the through holes 43 and screwed into the threaded holes 44 to fixedly bridge the enhancement members 42 between the end rings 30. The bodies of the enhancement members 42 are inlaid in the corresponding inlay channels 41 in tight abutment with the outer arc surfaces of the arc-shaped bodies 21. Accordingly, the enhancement members 42 can directly apply radial force to the iron core 20 to more firmly hold the arc-shaped bodies 21 together and keep the iron core 20 in the annular form. Each through hole 43 is axially sequentially divided into a large diameter section 431, a small diameter section 432 and an annular shoulder section 433 defined between the large diameter section 431 and the small diameter section 432. The small diameter section 432 of the through hole 43 is coaxially serially connected to the threaded hole 44 of the enhancement member 42.

In the fixing enhancement mechanism 10 for the large iron core, the end rings 30 are connected with the iron core 20 to provide axial fixing force for the iron core 30. In addition, the enhancement members 42 of the enhancement section 40 are inlaid in the inlay channels 41 in tight abutment with the arc-shaped bodies 21. By means of the connection bolts 45, the enhancement members 42 are connected with the end rings 30 to directly apply radial fixing force to the iron core 20. The enhancement member's own rigidity ensures stable radial force. The cross-sectional shape of the enhancement member can be modified to achieve better rigidity without departing from the spirit of the present invention.

As aforesaid, the enhancement members 42 are inlaid in the inlay channels 41 in tight abutment with the outer circumference of the iron core 20. The reservation amount of the through holes 43 can be changed and the dimensional tolerance can be controlled to optimize the attachment of the enhancement member 42 to the iron core 20. In assembling process, an external force is exerted onto the enhancement members 42 to press the same toward the center of the iron core 20. Then the connection bolts 45 are used to connect the enhancement members 42 with the end rings 30. Accordingly, the enhancement members 42 can be inlaid in the inlay channels 41 in tight abutment with the outer circumference of the iron core 20 to ensure that the fixing force is enhanced by the enhancement section 40.

In comparison with the prior art, the fixing enhancement mechanism 10 for the large iron core of the present invention is able to apply both axial force and radial force to the iron core 20 to securely keep the iron core 20 in the annular force. Moreover, the fixing enhancement mechanism 10 is composed of a smaller number of components so that the volume and weight of the fixing enhancement mechanism 10 are reduced. Accordingly, the room will not be wasted and the iron core 20 is prevented from collapsing due to overweight. Also, the fixing enhancement mechanism 10 is free from the problem of heat accumulation. Therefore, the power output of the motor will not be affected.

The above embodiments are only used to illustrate the present invention, not intended to limit the scope thereof. Many modifications of the above embodiments can be made without departing from the spirit of the present invention.

What is claimed is:

1. A fixing enhancement mechanism for large iron core, comprising:
    an iron core composed of several arc-shaped bodies, the arc-shaped bodies being successively connected in an annular form with their curvature centers coinciding with each other; and
    two end rings coaxially fixedly connected to two axial ends of the iron core respectively for keeping the iron core in the annular form, the fixing enhancement mechanism being characterized in that the fixing enhancement mechanism further comprises an enhancement section having several rod-shaped enhancement members, first ends and second ends of the enhancement members being respectively connected to the end rings, whereby the enhancement members are bridged between the end rings in abutment with outer arc surfaces of the arc-shaped bodies of the iron core;
    wherein several pairs of through holes are respectively formed on the end rings, the through holes having axes in parallel to the axis of the iron core, several pairs of threaded holes at the first and second ends of the enhancement members corresponding to the through holes respectively, several pairs of connection bolts being respectively passed through the through holes and screwed in the threaded holes;
    wherein each through hole is axially sequentially divided into a large diameter section, a small diameter section and an annular shoulder section defined between the large diameter section and the small diameter section, the small diameter section being coaxially serially connected to the threaded hole of the enhancement member.

2. The fixing enhancement mechanism for the large iron core as claimed in claim 1, wherein the enhancement section further includes several inlay channels with predetermined depth, the inlay channels being formed on the outer arc surfaces of the arc-shaped bodies respectively, the inlay channels extending along an axis of the iron core, whereby the enhancement members are respectively correspondingly inlaid in the inlay channels.

3. The fixing enhancement mechanism for the large iron core as claimed in claim 2, wherein each enhancement member has a circular cross section.

* * * * *